(12) United States Patent
Nose

(10) Patent No.: US 11,495,790 B2
(45) Date of Patent: Nov. 8, 2022

(54) CATHODE MIXTURE AND METHOD FOR PRODUCING THE SAME

(71) Applicant: TOYOTA JIDOSHA KABUSHIKI KAISHA, Toyota (JP)

(72) Inventor: Masafumi Nose, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 16/418,177

(22) Filed: May 21, 2019

(65) Prior Publication Data

US 2019/0372105 A1 Dec. 5, 2019

(30) Foreign Application Priority Data

Jun. 1, 2018 (JP) .............................. JP2018-106363

(51) Int. Cl.
| | | |
|---|---|---|
| H01M 4/36 | (2006.01) | |
| H01M 4/62 | (2006.01) | |
| H01M 4/38 | (2006.01) | |
| H01M 4/04 | (2006.01) | |
| H01M 10/052 | (2010.01) | |
| H01M 4/02 | (2006.01) | |

(52) U.S. Cl.
CPC ............ *H01M 4/364* (2013.01); *H01M 4/04* (2013.01); *H01M 4/38* (2013.01); *H01M 4/625* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 9,865,873 B2 | 1/2018 | Nagata et al. | |
| 2010/0151335 A1 | 6/2010 | Senga et al. | |
| 2012/0301778 A1 | 11/2012 | Trevey et al. | |
| 2013/0040208 A1 | 2/2013 | Kanno et al. | |
| 2015/0162614 A1* | 6/2015 | Koshika | H01M 4/13 |
| | | | 429/189 |
| 2016/0118660 A1 | 4/2016 | Nagata et al. | |
| 2016/0351964 A1 | 12/2016 | Jeong et al. | |
| 2017/0317337 A1 | 11/2017 | Hayashi et al. | |
| 2017/0317381 A1 | 11/2017 | Kim et al. | |
| 2018/0069262 A1 | 3/2018 | Utsuno et al. | |
| 2019/0051890 A1 | 2/2019 | Nose | |
| 2019/0372106 A1 | 12/2019 | Nose | |
| 2019/0372107 A1 | 12/2019 | Nose et al. | |
| 2020/0168897 A1 | 5/2020 | Ikeda et al. | |

FOREIGN PATENT DOCUMENTS

| | | |
|---|---|---|
| CN | 102823049 A | 12/2012 |
| CN | 105308774 A | 2/2016 |
| JP | 2011-029139 A | 2/2011 |
| JP | 2011-181260 A | 9/2011 |
| JP | 5388069 B2 | 1/2014 |
| JP | 5445809 B1 | 3/2014 |
| JP | 2014-160572 A | 9/2014 |
| JP | 2015-146281 A | 8/2015 |
| JP | 2015-176849 A | 10/2015 |
| JP | 2017-084686 A | 5/2017 |
| JP | 2017-091810 A | 5/2017 |
| JP | 2017-168434 A | 9/2017 |
| JP | 2019-33067 A | 2/2019 |
| WO | 2011/118801 A1 | 9/2011 |
| WO | 2016/063877 A1 | 4/2016 |

OTHER PUBLICATIONS

Suzuki et al.; "Composite Sulfur Electrode for All-solid-state Lithium-sulfur Battery with Li2S—GeS2—P2S5-based Thio-Liscon Solid Electrolyte;" Electrochemistry; 2018; pp. 1-5; vol. 26, No. 1; The Electrochemical Society of Japan.
Choi et al.; "Performance improvement of all-solid-state Li—S batteries with optimizing morphology and structure of sulfur composite electrode;" Journal of Alloys and Compounds; 2017; pp. 787-794; vol. 723.
Feb. 12, 2020 Restriction Requirement issued U.S. Appl. No. 16/040,216.
May 1, 2020 Office Action issued in U.S. Appl. No. 16/040,216.
Aug. 3, 2020 Office Action issued in U.S. Appl. No. 16/420,418.
Tanibata et al., "A novel discharge-charge mechanism of a S—P2S5 composite electrode without electrolytes in all-solid-state Li/S batteries," Journal of Materials Chemistry A, 2017, 5, pp. 11224-11228.
Oct. 23, 2020 Office Action issued in U.S. Appl. No. 16/040,216.
Jan. 25, 2021 Notice of Allowance issued in U.S. Appl. No. 16/420,418.
Sep. 28, 2021 Office Action Issued in U.S. Appl. No. 16/040,216.
U.S. Appl. No. 16/040,216, filed Jul. 19, 2018 in the name of Nose.
Mar. 1, 2021 Advisory Action issued in U.S. Appl. No. 16/040,216.
Jan. 31, 2022 Office Action Issued in U.S. Appl. No. 16/040,216.
May 17, 2022 Notice of Allowance issued in U.S. Appl. No. 16/040,216.
Jun. 9, 2022 Corrected Notice of Allowability issued in U.S. Appl. No. 16/040,216.
Aug. 2, 2022 Corrected Notice of Allowability issued in U.S. Appl. No. 16/040,216.

* cited by examiner

*Primary Examiner* — Tanisha Diggs
(74) *Attorney, Agent, or Firm* — Oliff PLC

(57) ABSTRACT

An object of the present disclosure is to produce a cathode mixture with which the charge and discharge capacities of a sulfur battery can be increased. The present disclosure achieves the object by providing a method for producing a cathode mixture used in a sulfur battery, wherein the cathode mixture is produced by a mechanical milling treatment of a raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material.

4 Claims, 2 Drawing Sheets

CATHODE MIXTURE AND METHOD FOR PRODUCING THE SAME

TECHNICAL FIELD

The present disclosure discloses a cathode mixture used in a sulfur battery and a method for producing the cathode mixture.

BACKGROUND ART

In accordance with the rapid spread of information-related apparatuses and communication devices such as a personal computer, a video camera, and a portable telephone in recent years, the development of a battery used for the power source thereof is regarded as important. Also in the automobile industry, the development of a battery with high out-put and high capacity for electric vehicles or hybrid vehicles is in progress.

The development of a sulfur battery using sulfur as a cathode active material is in progress. The sulfur has a feature that the theoretical capacity thereof is extremely high as 1675 mAh/g. Also, in the field of a sulfur battery, an attempt has been made to improve the availability of the sulfur and to increase the charge and discharge capacities of a sulfur battery. Patent Literature 1 discloses a cathode mixture comprising a $Li_2S$—$P_2S_5$ based solid electrolyte, a cathode active material that is elemental sulfur, and a conductive material that is a carbon material. Patent Literature 1 describes a cathode mixture produced by mixing the following (a) to (c) with a planetary type ball mill, and an all solid state lithium-sulfur battery using the same: (a) as a solid electrolyte, a $Li_2S$—$P_2S_5$ based sulfide solid electrolyte preliminarily produced by a planetary type ball mill treatment, or a sulfide solid electrolyte preliminarily produced with a planetary type ball mill by using $Li_2S$, red phosphorous, and sulfur as starting materials, (b) sulfur as a cathode active material, and (c) Ketjen black as a conductive auxiliary material.

Also, Patent Literature 2 describes a method for producing a cathode mixture, the method comprising steps of: a preparing step (1) of preparing a sulfide solid electrolyte configured an ion conductor including Li, P, and S, and LiBr; and an amorphizing step (2) of amorphizing a mixture including a sulfide solid electrolyte, a cathode active material that is elemental sulfur, and a conductive auxiliary material that is a carbon material, to obtain a cathode mixture.

Also, patent Literature 3 describes a method for producing a cathode mixture by mechanical milling, using sulfur, acetylene black, and $80Li_2S$-$20P_2S_5$ sulfide solid electrolyte preliminarily produced by a planetary type ball mill as starting materials.

Further, Patent Literature 4 describes a cathode mixture produced by using a planetary type ball mill to $Li_2S$ and Li salt ($LiI$, $LiBr$, $LiBnO_3$, $LiBF_4$), and an all solid state battery using the cathode mixture.

Further, Patent Literature 5 describes a method for producing a cathode mixture by step (1) of mixing (A) sulfur or a corona product thereof, (B) a sulfur interfacial reaction improver preliminarily produced with a planetary type ball mill using $Li_2S$ and $P_2S_5$ as starting materials (composition ratio (molar ratio) of $Li_2S$:$P_2S_5$=65:35), and (C) a conductive material; and step (2) of mixing a $80Li_2S$-$20P_2S$ sulfide solid electrolyte preliminarily produced by a planetary type ball mill, and the mixture obtained in step (1).

CITATION LIST

Patent Literatures

Patent Literature 1: Japanese Patent (JP-B) No. 5445809
Patent Literature 2: Japanese Patent Application Laid-Open (JP-A) No. 2017-091810
Patent Literature 3: JP-A No. 2011-181260
Patent Literature 4: International Publication No. WO2016/063877
Patent Literature 5: JP-A No. 2014-160572

SUMMARY OF DISCLOSURE

Technical Problem

Since the availability of the sulfur is not sufficiently improved in conventional art, there is a need to further increase the charge and discharge capacities of a sulfur battery. The present disclosure has been made in view of the above circumstances, and a main object thereof is to provide a cathode mixture and a method for producing the same capable of improving the availability of the sulfur and increasing the charge and discharge capacities of the sulfur battery.

Solution to Problem

In order to achieve the object, the present disclosure provides a cathode mixture and a method for producing the same used in a sulfur battery, wherein the cathode mixture is produced by a mechanical milling treatment of a raw material mixture comprising: $Li_2S$, $LiX$, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material.

By the mechanical milling of a raw material mixture comprising: $Li_2S$, $LiX$, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material, a cathode mixture in which excellent interfaces between the sulfur and the solid electrolyte and between the sulfur and the conductive auxiliary material are formed, may be produced.

Advantageous Effects of Disclosure

The present disclosure exhibits effects such that a cathode mixture capable of improving the availability of sulfur and increasing the charge and discharge capacities of a sulfur battery may be produced.

DESCRIPTION OF EMBODIMENTS

Figure 1:
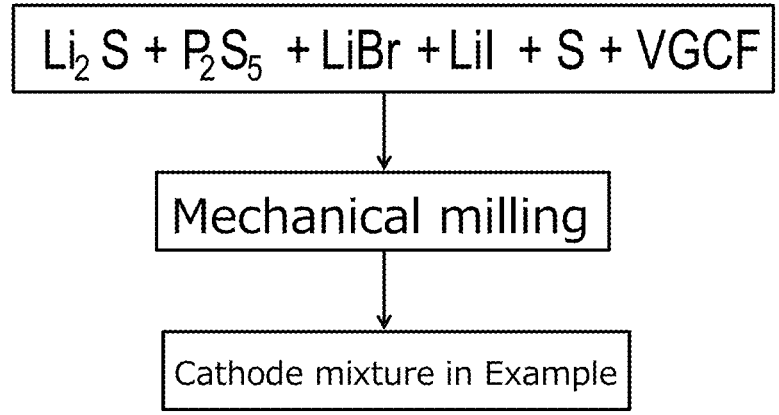
FIG. 1 is a diagram for explaining the flow of the production method in Example of the present disclosure.

The cathode mixture and the method for producing the same of the present disclosure will be hereinafter described in detail.

In the cathode mixture and the method for producing the same of the present disclosure, the cathode mixture is used in a sulfur battery, and in order to achieve the above described object, the method is featured by the cathode mixture being produced by a mechanical milling treatment of a raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material.

By the mechanical milling of a raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material, a cathode mixture in which excellent interfaces between the sulfur and the solid electrolyte and between the sulfur and the conductive auxiliary material are formed, may be produced.

The reason why the charge and discharge capacities of a sulfur battery may be increased by producing a cathode mixture of a sulfur battery by the above described production method is presumed as follows.

When the elemental sulfur is used as a cathode active material of an all solid state battery, charge and discharge reactions proceed only at a three-phase interface where a solid electrolyte that can be a Li ion path and a conductive auxiliary material that can be an electron path coexist on the surface of the sulfur that is an active material.

In the present disclosure, since the cathode mixture is produced by a mechanical milling treatment to the raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material, the excellent three-phase interface of the solid electrolyte and the conductive auxiliary material to the sulfur may be formed.

Accordingly, the charge and discharge reactions may proceed during charge and discharge to presumably improve the availability of the sulfur and to increase the charge and discharge capacities of the sulfur battery.

Incidentally, it is generally thought that, in a cathode active material of elemental sulfur, a reaction of S becoming $Li_2S$ via $Li_2S_2$ proceeds during discharge.

As shown in the later described Example, the effect that the cathode mixture produced by a mechanical milling treatment to the raw material mixture comprising: $Li_2S$, LiX, in which X is selected from F, Cl, Br, or T, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material is capable of exhibiting high charge and discharge capacities, was confirmed for the first time.

Patent Literatures 1 to 5 disclose a production of a cathode mixture by a mechanical milling such as a ball milling using a planetary type ball mill, wherein a sulfide solid electrolyte preliminarily produced, a sulfur simple substance and a corona product thereof, those are cathode active materials, and a conductive auxiliary material are mixed; however, unlike the present disclosure, these literatures do not describe the production of a cathode mixture by a mechanical milling treatment of a raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material.

The effects of the cathode mixture produced by a mechanical milling treatment of a raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material that the availability of the sulfur in the cathode mixture may be improved and that the charge and discharge capacities may be increased are phenomena and effects cannot be expected from the conventional art of Patent Literatures 1 to 5.

The reason why the present disclosure exhibits phenomena and effects cannot be expected from the conventional art of Patent Literatures 1 to 5 is presumed as follows.

In the process of synthesizing a solid electrolyte by a mechanical milling treatment of a raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material, a part of the elemental sulfur or a lithium polysulfide ($Li_xS$) generated by the reaction of the elemental sulfur and $Li_2S$ is thought to be incorporated into the structure of the solid electrolyte. After that, the elemental sulfur and the lithium polysulfide reach to the solid-solution limit in the solid electrolyte, the elemental sulfur and $Li_2S$ are redeposited on the surface of the solid electrolyte, and the contacts between the solid electrolyte and the elemental sulfur and between the solid electrolyte and the $Li_2S$ are improved. Thus, it is presumed that the availability of the sulfur in the cathode mixture is improved and the charge and discharge capacities are increased.

In specific, it is as follows. Firstly, in the present disclosure as described above, by carrying out a mechanical milling treatment of the raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material, the dispersibility of sulfur is improved and thus the availability of sulfur in the cathode mixture is improved. When $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material are mixed, a part of the sulfur simple substance or a lithium polysulfide ($Li_xS$) generated by the reaction of the elemental sulfur and $Li_2S$ is incorporated into the structure of the solid electrolyte, as described above. On this occasion, if it is rich in sulfur, the sulfur is saturated and is deposited on the surface of the solid electrolyte in some cases. Accordingly, the sulfur incorporated into the structure of the solid electrolyte functions as the solid electrolyte, while the deposited sulfur functions as the cathode active material. Therefore, as the result, the availability of the sulfur is thought to be improved.

In the present disclosure, when $M_xS_y$ is $P_2S_5$, the sulfur is highly reactive with $P_2S_5$ and thus a network is easily formed. This is thought to be caused by the highly reactive cross-linked sulfur in the $P_2S_5$ conformation being easily chemically reacted by being mixed with the sulfur. Incidentally, in the conventional methods for producing a cathode mixture, since the solid electrolyte and the elemental sulfur are mechanically mixed, the reaction between the solid electrolyte and the elemental sulfur does not usually occur. The reason is thought to be because, since $P_2S_5$ and $Li_2S$ those are starting materials of the solid electrolyte are reacted in advance, the reaction between $P_2S_5$ and the sulfur does not occur even if they are mixed with the elemental sulfur thereafter.

Meanwhile, in the conventional art, it is presumed that the above described phenomena do not occur since the cathode mixture is produced by mixing a sulfide solid electrolyte preliminarily produced by using a planetary type ball mill, elemental sulfur and a corona product thereof those are cathode active materials, and a conductive auxiliary material by a mechanical milling such as a ball milling.

Also, in the present disclosure, halogenated Li salt is included so as to improve the Li ion conductivity in the Li ion conducting path in the cathode mixture.

The cathode mixture and the method for producing the same will be hereinafter described.

1) Raw Material Mixture

The raw material mixture is a mixture including starting materials of the sulfide solid electrolyte, a cathode active material including a sulfur simple substance, and a conductive auxiliary material including a carbon material. That is, the raw material mixture comprises: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material.

(i) Starting Materials of Sulfide Solid Electrolyte

The sulfide solid electrolyte produced from the starting materials of the sulfide solid electrolyte comprises an ion conductor including at least Li and S, and includes $Li_2S$, LiX, in which X is selected from F, Cl, Br, or I, and $M_xS_y$.

In LiX, X is selected from F, Cl, Br, or I. Incidentally, X may be one kind selected from F, Cl, Br, or I, and may be two kinds or more selected from F, Cl, Br, or I, but the former is preferable. Specific examples of the LiX may include LiF, LiCl, LiBr, and LiI; among them, LiBr and LiI are preferable. Also, the LiX may be two kinds or more selected from the above and there may be a case a plurality of the LiX is used; for example, LiBr and LiI are preferably used as the LiX. The proportion of the LiX in the raw material mixture is, for example, 1 mol % or more, may be 5 mol % or more, and may be 10 mol % or more. Meanwhile, the proportion of the LiX is, for example, 40 mol % or less, may be 35 mol % or less, and may be 30 mol % or less. Also, the raw material mixture preferably includes the specific proportion of $Li_2S$ and $P_2S_5$. In specific, the molar ratio of X to P (X/F) is, for example, 0.01 or more, may be 0.1 or more, and may be 0.3 or more. Meanwhile, the molar ratio of X to P (X/P) is, for example, 10 or less, may be 3 or less, and may be 1 or less. Incidentally, when two kinds or more of the LiX are used, the total of the LiX is preferably in the above range.

In $M_xS_y$, M is selected from P, Si, Ge, B, Al, or Sn, and x and y are integers that gives electric neutrality to S according to the kind of M. Incidentally, M may be one kind selected from P, Si, Ge, B, Al, or Sn, or may be two kinds or more selected from P, Si, Ge, B, Al, or Sn, but the former is preferable. Specific examples of the $M_xS_y$ may include $P_2S_5$, $SiS_2$, $GeS_2$, $B_2S_3$, $Al_2S_3$, and $SnS_2$. Examples of the combination of $Li_2S$, LiX, and $M_xS_y$ may include $Li_2S$—$P_2S_5$, $Li_2S$—$SiS_2$, $Li_2S$—$GeS_2$, $Li_2S$—$B_2S_3$, $Li_2S$—$Al_2S_3$, and $Li_2S$—$SnS_2$. Also, the $M_xS_y$, in which M is selected from P, Si, Ge, B, Al, or Sn, x and y is an integer that gives electric neutrality to S according to the kind of M, may be two kinds or more selected from the above and there may be a case a plurality of the LiX is used; specific examples may include $Li_2S$—$P_2S_5$—$GeS_2$, $Li_2S$—$P_2S_5$—$SiS_2$, and $Li_2S$—$SiS_2$—$Al_2S_3$.

An additional electrolyte such as $Li_3PO_4$ may be further added to the starting materials of the sulfide solid electrolyte.

The sulfide solid electrolyte usually has Li ion conductivity.

The ion conductor includes at least Li and S. There are no particular limitations on the ion conductor if it includes at least Li and S, and examples thereof may include an ion conductor having an ortho-composition. The ortho here is generally referred to those having the highest hydration degree among the oxo-acid obtained by hydrating the same oxide. In the present disclosure, the crystal composition of a sulfide to which the $Li_2S$ is added the most is referred to as an ortho-composition. For example, in $Li_2S$—$P_2S_5$ based, $Li_3PS_4$ corresponds to the ortho-composition.

Also, the phrase "having an ortho-composition" includes not only a strict ortho-composition but also compositions in the vicinity thereof; in specific, is referred to those including an anion structure ($PS_4^{3-}$ structure) of the ortho-composition as a main component. The proportion of the anion structure of the ortho-composition to the total anion structures in the ion conductor is preferably 60 mol % or more, more preferably 70 mol % or more, further preferably 80 mol % or more, and particularly preferably 90 mol % or more. Incidentally, the proportion of the anion structure of the ortho-composition may be determined by, for example, a Raman spectroscopy, a NMR, and an XPS.

Also, for example, for a sulfide solid electrolyte of $Li_2S$—$P_2S$, based, the ratio of $Li_2S$ and $P_2S_5$ for obtaining the ortho-composition is $Li_2S$:$P_2S$; =75:25 on a molar basis. The raw material mixture in the present disclosure preferably comprises $Li_2S$ and $P_2S_5$ in the ratio of 60:40 to 90:10 (molar ratio). In specific, the proportion of $Li_2S$ to the total of $Li_2S$ and $P_2S_5$ is, for example, 60 mol % or more, may be 70 mol % or more, may be 72 mol % or more, and may be 74 mol % or more. Meanwhile, the proportion of $Li_2S$ is, for example, 90 mol % or less, may be 80 mol % or less, may be 78 mol % or less, and may be 76 mol % or less. Also, in the raw material mixture, the molar ratio of Li to P (Li/P) is, for example, 0.1 or more, may be 1.0 or more, and may be 1.5 or more. Meanwhile, the molar ratio of Li to P (Li/P) is, for example, 100 or less, may be 10 or less, and may be 7 or less.

Examples of the shape of the sulfide solid electrolyte may include a granular shape. The average particle size ($D_{50}$) of the granular shaped sulfide solid electrolyte is preferably, for example, 0.1 µm or more and 50 µm or less. Also, the sulfide solid electrolyte preferably has high Li ion conductivity, and the Li ion conductivity at normal temperature is preferably $1\times10^{-4}$ S/cm or more, for example, and more preferably $1\times10^{-3}$ S/cm or more. Incidentally, for the average particle size, a value calculated with a laser diffraction type particle size distribution meter or a value measured based on an image analysis using an electron microscope such as SEM may be used.

The sulfide solid electrolyte may be, for example, a crystal, may be sulfide glass, and may be glass ceramic. The sulfide solid electrolyte may include, for example, at least one of $Li_2S$ and $P_2S_5$ those are raw materials.

The content of the sulfide solid electrolyte in the raw material mixture to 100 parts by weight of a cathode active material (elemental sulfur) is for example, 20 parts by weight or more, and may be 30 parts by weight or more. Meanwhile, the content of the sulfide solid electrolyte in the raw material mixture is, for example, 400 parts by weight or less, and may be 250 parts by weight or less. When the content of the sulfide solid electrolyte is little, it may be difficult to allow the cathode mixture obtained in the present disclosure to have sufficient ion conductivity. Also, when the content of the sulfide solid electrolyte is much, the content of the cathode active material becomes less, and it may be difficult to secure sufficient charge and discharge capacities.

(ii) Cathode Active Material

The cathode active material is usually elemental sulfur. The elemental sulfur with as higher purity as possible is preferably used. Examples of the elemental. sulfur may include $S_8$ sulfur. Specific examples thereof may include αsulfur (rhombic sulfur), βsulfur (monoclinic sulfur), and γsulfur (monoclinic sulfur).

The content of the cathode active material in the raw material, mixture is preferably, for example, 20 weight % or more, and more preferably 25 weight % or more. Also, the content of the cathode active material in the mixture is preferably, for example, 70 weight % or less, and more preferably 60 weight % or less. When the content of the cathode active material is little, it may be difficult to secure sufficient charge and discharge capacities.

(iii) Conductive Auxiliary Material

A conductive auxiliary material is a carbon material used in a mixing step. The conductive auxiliary material has a function of improving the electron conductivity of the cathode mixture. Also, it is presumed that the conductive auxiliary material functions as a reductant that reduces the elemental sulfur when the mixture is mixed.

Any carbon materials may be used for the conductive auxiliary material, and examples thereof may include vapor-grown carbon fiber (VGCF), acetylene black, activated carbon, furnace black, carbon nanotube, Ketjen black, and graphene.

The content of the conductive auxiliary material in the mixture is preferably, for example, in a range of 10 parts by weight to 200 parts by weight, and more preferably in a range of 15 parts by weight to 100 parts by weight, to 100 parts by weight of the cathode active material (elemental sulfur).

2) Mixing Step

In the mixing step, the cathode mixture is obtained by mixing a raw material mixture comprising: starting materials of a sulfide solid electrolyte, a cathode active material including an elemental sulfur, and a conductive auxiliary material including a carbon material. Examples of the method for mixing the raw material mixture may include a mechanical milling. The mechanical milling may be a dry mechanical milling and may be a wet mechanical milling.

There are no particular limitations on the mechanical milling if the method allows the cathode mixture to be mixed while applying mechanical thereto. Examples thereof may include a ball mill, a vibrating mill, a turbo mill, a mechano-fusion, and a disk mill; above all, a ball mill is preferable, and a planetary type ball mill is particularly preferable.

A liquid used for the wet mechanical milling is preferably aprotic to the extent that hydrogen sulfide is not generated, and specific examples may include aprotic liquids such as a polar aprotic liquid and a non-polar aprotic liquid.

When the planetary type ball mill is used, the cathode mixture and a pulverizing ball are added to a container and treated at a predetermined rotation speed for a predetermined time. A weighing table rotation speed when carrying out the planetary type ball mill is preferably, for example, in a range of 200 rpm to 800 rpm, and more preferably in a range of 300 rpm to 600 rpm. Also, the treating time for carrying out the planetary type ball mill is preferably, for example, in a range of 30 minutes to 100 hours, and more preferably in a range of 5 hours to 60 hours. Also, examples for the material of the container used for the ball mill and of the pulverizing ball may include $ZrO_2$ and $Al_2O_3$. Also, the diameter of the pulverizing ball is, for example, in a range of 1 mm to 20 mm. The mechanical milling is preferably carried out under an inert gas atmosphere (such as Ar gas atmosphere).

3) Cathode Mixture for Sulfur Battery

The cathode mixture in the present disclosure is a material obtained by using above described materials and methods. In specific, the cathode mixture in the present disclosure is a cathode mixture used in a sulfur battery, and is featured by including a composite body obtained by a mechanical milling treatment to a raw material mixture comprising: $Li_2S$, LiX, in which X is selected from F, Cl, Br, or I, and $M_xS_y$, in which M is selected from P, Si, Ge, B, Al, or Sn, x and y is an integer that gives electric neutrality to S according to the kind of M; a cathode active material including an elemental sulfur; and a conductive auxiliary material including a carbon material.

Also, for the cathode mixture in the present disclosure, when a diffraction intensity of a peak at $2\theta=23.05°\pm1.00°$ is regarded as $I_A$, and a diffraction intensity of a peak at $2\theta=27.05°+1.000$ is regarded as $I_B$, in X-ray diffraction measurement using a CuKα ray, the value of $I_B$ is preferably larger than the value of $I_A$.

The cathode mixture is usually used for a cathode layer of a sulfur battery; thus, it is also possible to provide a method for producing a sulfur battery, the sulfur battery includes a cathode layer, an anode layer, and an electrolyte layer formed between the cathode layer and the anode layer, and the method includes a cathode layer forming step of forming a cathode layer by using the above described cathode mixture. The sulfur battery here refers to a battery using an elemental sulfur as a cathode active material. As the electrolyte used for the electrolyte layer, for example, a solid electrolyte is preferably used. There are no particular limitations on the solid electrolyte, and for example, the above described sulfide solid electrolyte may be used. There are no particular limitations on the anode active material, and examples thereof may include metal lithium and a lithium alloy (such as Li—In alloy). The sulfur battery usually includes a cathode current collector that collects current of the cathode layer and an anode current collector that collects current of the anode layer.

The sulfur battery may be a primary battery or may be a secondary battery, but the secondary battery is preferable among them since it may be repeatedly charged and discharged, and is useful as, for example, a car-mounted battery. Incidentally, the primary battery includes a usage of a secondary battery as a primary battery (the use for the purpose of just one time discharge after charge). Above all, the sulfur battery is preferably a lithium-sulfur battery.

<X-Ray Diffraction Measurement>

When carrying out an X-ray diffraction (XRD) measurement to the cathode mixture, the measurement is carried out to a powder sample under an inert atmosphere and under conditions using a CuKα ray. For the powder sample used in the XRD measurement, for example, the cathode mixture of a battery produced by the above described production method using the cathode mixture produced by the above described production method, of which open-circuit voltage (OCV) is adjusted to 2.2 V (vs Li/Li$^+$) or more and 2.5 V (versus Li/Li) or less, or a cathode mixture of a charged state battery, may be used.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Hereinafter, the present disclosure will be described more specifically with reference to Examples. Incidentally, each operation such as weighing, synthesizing and drying was carried out under Ar atmosphere, unless otherwise indicated.

Example (1 Step)

<Production of Cathode Mixture>

The starting materials of the sulfide solid electrolyte: Li$_2$S (from Rockwood Lithium Inc.), LiBr, LiI, and P$_2$S$_5$ (from Sigma-Aldrich Co. LLC), elemental sulfur powder (from Kojundo Chemical Lab. Co., Ltd.), and VGCF (conductive auxiliary material.) were prepared. These starting materials of the raw material mixture were weighed so as to be the weight ratio shown in Table 1, and each material was kneaded in an agate mortar for 15 minutes. These raw material mixture were projected into a container (45 cc, made of ZrO$_2$) of a planetary type ball mill dried under reduced pressure at 150° C. all night in advance, further, ZrO$_2$ balls (φ=4 mm, 96 g, 500 pieces) dried under reduced pressure at 150° C. all night in advance, were projected thereinto, and the container was completely sealed. This container was installed to a planetary type ball mill machine (P7 manufactured by Fritsch Japan Co., Ltd), and a cycle of mechanical milling for 1 hour at weighing table rotation speed of 500 rpm and 15 minutes at rest was repeated to carry out a mechanical milling for total of 48 hours. After the mechanical milling, the container was moved into a glovebox, and a sample was collected. Incidentally, the samples adhered to the ZrO$_2$ balls were collected by putting the balls in a sieve and shaking the sieve, and the samples adhered to inside the container were collected by scraping the container off by dispensing spoon. As described above, the cathode mixture was obtained.

Incidentally, the production method (flow of synthesis) of a cathode mixture in Example is referred to as 1 step, and the flow of the production method is shown in FIG. 1.

The weight of each material used as the starting material and the open-circuit voltage (OCV) of the produced cell are shown in Table 1.

TABLE 1

|  | Flow of synthesis | Starting materials [g] | | | | | |
|---|---|---|---|---|---|---|---|
|  |  | Li$_2$S | P$_2$S$_5$ | LiBr | LiI | S | Carbon (VGCF) |
| Example | 1 step | 0.38 | 0.61 | 0.19 | 0.20 | 1.05 | 0.57 |
| Comparative Example 1 | 2 step | 0.38 | 0.61 | 0.19 | 0.20 | 1.05 | 0.57 |
| Comparative Example 2 | 2 step | 0.53 | 0.85 | 0.00 | 0.00 | 1.05 | 0.57 |
| Reference Example | 1 step | 0.53 | 0.85 | 0.00 | 0.00 | 1.05 | 0.57 |

<Assembly of Battery>

A Li metal foil was prepared as an anode layer.

The solid electrolyte of 100 mg was placed in 1 cm$^2$ ceramic mold and pressed under 1 ton/cm$^2$ so as to pressure powder mold the solid electrolyte layer. On one side thereof, 7.8 mg of the cathode mixture was placed and pressed under 6 ton/cm$^2$ to produce a cathode layer. On the opposite side, the lithium metal foil was placed as an anode layer and pressed under 1 ton/cm$^2$ to obtain an power generating element. An Al foil (cathode current collector) was placed on the cathode layer side, and a Cu foil (anode current collector) was placed on the abode layer side. By the above described procedures, a battery was produced.

Comparative Example 1 (2 Step)

<Production of Solid Electrolyte>

Li$_2$S (from Rockwood Lithium Inc.), LiBr, LiI, and P$_2$S$_5$ (from Sigma-Aldrich Co. LLC) were used as starting materials. Those were weighed so in the molar ratio according to the weight ratio shown in Table 1 so that the composition of the solid electrolyte became 10LiI-15LiBr-37.5Li$_3$P$_4$, and each material was mixed in an agate mortar for 15 minutes. The mixture was projected into a container (45 cc, made of ZrO$_2$) of a planetary type ball mill, further, ZrO$_2$ balls (φ=4 mm, 96 g) were projected thereinto, and the container was completely sealed. This container was installed to a planetary type ball mill machine (P7 from Fritsch Japan Co., Ltd), and a cycle of mechanical milling for 1 hour at weighing table rotation speed of 500 rpm and 15 minutes at rest was repeated to carry out a mechanical milling for total of 24 hours. As described above, a solid electrolyte was obtained.

<Production of Cathode Mixture>

Elemental sulfur powder (from Kojundo Chemical Lab. Co., Ltd.) and VGCF (conductive auxiliary material) were prepared. These starting materials were weighed so as to be the weight ratio shown in Table 1, projected into the container of the planetary type ball mill in which the solid electrolyte was produced, and the container was completely sealed. This container was installed to a planetary type ball mill machine (P7 from Fritsch Japan Co., Ltd), and a cycle of mechanical milling for 1 hour at weighing table rotation speed of 500 rpm and 15 minutes at rest was repeated to carry out a mechanical milling for total of 24 hours. As described above, a cathode mixture was obtained.

Figure 2:
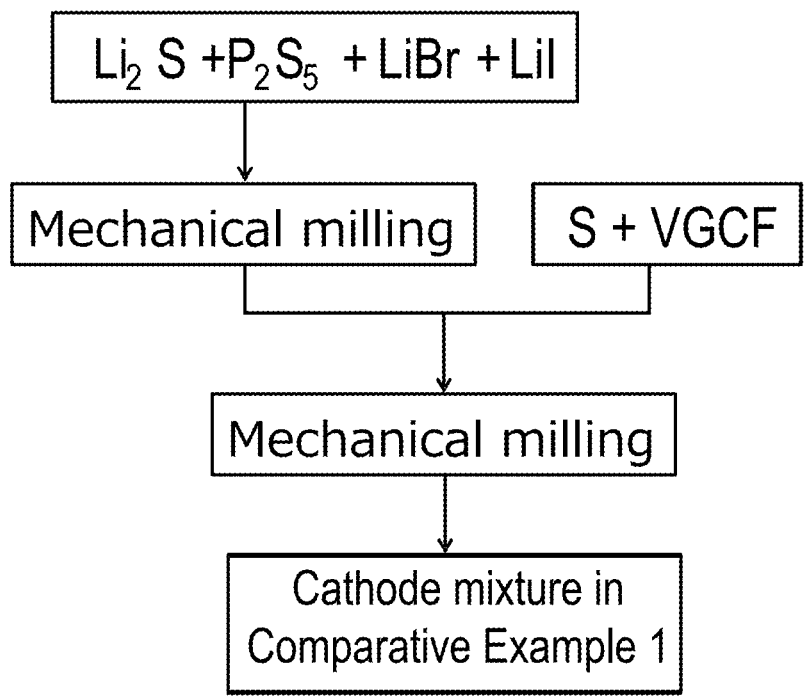
FIG. 2 is a diagram for explaining the flow of the production method in Comparative Example 1 of the present disclosure.
Figure 3:
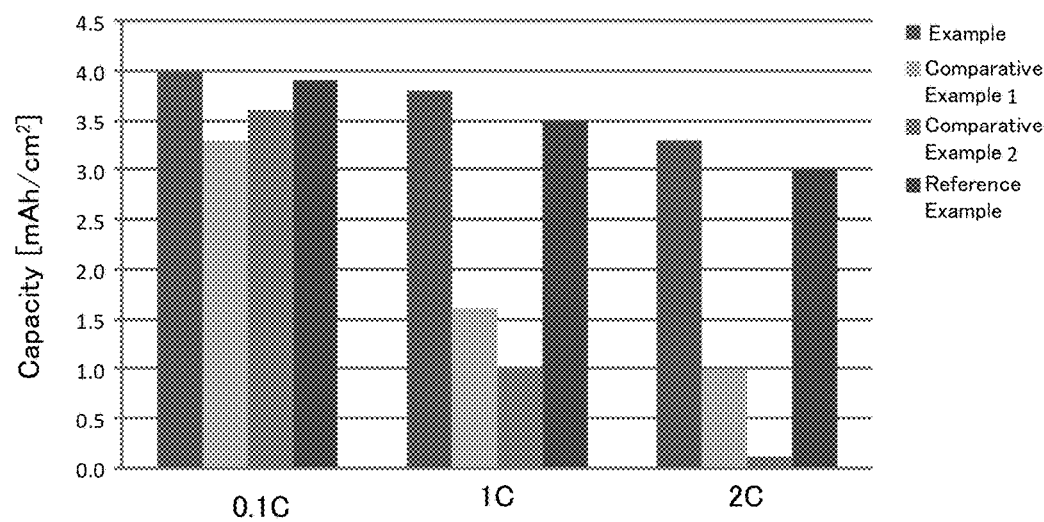
FIG. 3 is a graph showing discharge capacities at C/10, 1C, 2C of the batteries using the cathode mixtures obtained in Example, Comparative Examples 1, 2, and Reference Example.

Incidentally, the production method (flow of synthesis; of a cathode mixture in Comparative Example 1 is referred to as 2 step, and the flow of the production method is shown in FIG. 2.

and the high-rate discharge property (rate of the discharge capacity at 2 C to the discharge capacity at 0.1 C) of each battery using the cathode mixture obtained in Example and Comparative Example 1 are shown in Table 2 and FIG. 3.

TABLE 2

| | Starting materials [g] | | | | | | Synthesis | 60° C. [mAh/cm$^2$] | | |
|---|---|---|---|---|---|---|---|---|---|---|
| | Li$_2$S | P$_2$S$_5$ | LiBr | LiI | S | VGCF | method | 0.1 C. | 1 C. | 2 C. |
| Example | 0.38 | 0.61 | 0.19 | 0.20 | 1.05 | 0.57 | 1 step | 4.0 | 3.8 | 3.3 |
| Comparative Example 1 | 0.38 | 0.61 | 0.19 | 0.20 | 1.05 | 0.57 | 2 step | 3.3 | 1.6 | 1.0 |
| Comparative Example 2 | 0.53 | 0.85 | 0.00 | 0.00 | 1.05 | 0.57 | 2 step | 3.6 | 1.0 | 0.1 |
| Reference Example | 0.53 | 0.85 | 0.00 | 0.00 | 1.05 | 0.57 | 1 step | 3.9 | 3.5 | 3.0 |

<Assembly of Battery>

Regarding the assembly of a battery, the battery was obtained by fabricating a battery in the same manner as in Example.

Comparative Example 2 (2Step)

A battery was obtained in the same manner as in Comparative Example 1 except that the starting materials included neither LiBr nor LiI. The composition of the solid electrolyte is shown in Table 1.

Reference Example (1Step)

A battery was obtained in the same manner as in Example 1 except that the starting materials included neither LiBr nor LiI. The composition of the solid electrolyte is shown in Table 1.

[Evaluation]

<Property Evaluation of Cathode Mixture>

The property evaluation of the cathode mixture was carried out for each battery obtained in Example, Comparative Examples 1, 2, and Reference Example. The flow of the property evaluation is as follows:

(1) Temperature soak for 3 hours (60° C.);
(2) Discharge to 1.5 V at C/10, and then, rest for 10 minutes;
(3) Charge to 3.1 V at C/10, and then, rest for 10 minutes, after that, a cycle of discharge to 1.5 V at C/10 and 10 minutes at rest was carried out for total of 5 times;
(4) Charge to 3.1 V at C/10, and then, rest for 10 minutes; then, discharge to 1.5 V at C/3, and then, rest for 10 minutes, after that, discharge to 1.5 V at C/10, and then, rest for 10 minutes;
(5) Charge to 3.1 V at C/10, and then, rest for 10 minutes; then, discharge to 1.5 V at 1 C, and then, rest for 10 minutes, after that, discharge to 1.5 V at C/10, and then, rest for 10 minutes;
(6) Charge to 3.1 V at C/10, and then, rest for 10 minutes; then, discharge to 1.5 V at 2 C, and then, rest for 10 minutes, after that, discharge to 1.5 V at C/10, and then, rest for 10 minutes;
(7) Charge to 3.1 V at C/10, and then, rest for 10 minutes, then, discharge to 1.5 V at C/10, and then, rest for 10 minutes.

Incidentally, the value of current at 1 C of the battery produced in the present disclosure was 4.56 mA/cm$^2$.

The discharge capacity at C/10, 1C, 2C (corresponding to the fifth cycle of flow of the property evaluation (3), (5), (6))

As shown in Table 2 and FIG. 3, at low current density (C/10), the discharge capacity of the batteries in Comparative Examples 1 and 2, 2step synthesis, was slightly lower than that in Example and Comparative Example, 1step synthesis. On the other hand, when the batteries were discharged at high current density (1C), the difference between the 1step synthesis, Example and Reference Example, and the 2step synthesis, Comparative Examples 1 and 2, was large. In specific, it became clear that the addition of LiBr and LiI inhibited the capacity from being degraded at high current density. The battery using the cathode mixture exhibiting such an effect is preferably used under the usage environment where the output (load) change is drastic such as car-mounting application in particular, since the advantage of the battery is that the capacity change is small. Incidentally, the same effect can be expected when the similar sulfide (such as SiS$_2$, GeS$_2$, B$_2$S$_3$, Al$_2$S$_3$, and SnS$_2$) to P$_2$S$_5$ is used instead.

What is claimed is:

1. A method for producing a cathode mixture used in a sulfur battery, comprising a one step mechanical milling treatment of a raw mixture, wherein the raw material mixture comprises:
   a cathode active material including an elemental sulfur, Li$_2$S, LiI, LiBr, and P$_2$S$_5$; and
   a conductive auxiliary material including vapor-grown carbon fiber, wherein
   the raw material mixture components are simultaneously subjected to the mechanical milling treatment, and a proportion of Li$_2$S to the total of Li$_2$S and P$_2$S$_5$ is 74 mol % or more and 76 mol % or less.

2. The method for producing a cathode mixture according to claim 1, wherein the mechanical milling treatment is carried out using planetary ball milling.

3. The method for producing a cathode mixture according to claim 1, wherein the mechanical milling treatment is carried out for 48 hours or more and 100 hours or less.

4. The method for producing a cathode mixture according to claim 1, wherein a lithium polysulfide is generated by reaction of the elemental sulfur and Li$_2$S during the mechanical milling.

* * * * *